United States Patent [19]

Lang

[11] Patent Number: 4,847,683

[45] Date of Patent: Jul. 11, 1989

[54] DIAGONAL CORRECTION IN COMPOSITE VIDEO DECODER

[75] Inventor: Stuart E. Lang, Montville, N.J.

[73] Assignee: Dubner Computer Systems, Inc., Paramus, N.J.

[21] Appl. No.: 188,946

[22] Filed: May 2, 1988

[51] Int. Cl.⁴ .............................................. H04N 9/78
[52] U.S. Cl. ........................................ 358/37; 358/31; 358/36
[58] Field of Search .............................. 358/31, 36, 37

[56] References Cited

U.S. PATENT DOCUMENTS 4,050,084  9/1977  Rossi ........................................ 358/31
4,656,501  4/1987  Casey et al. .............................. 358/36

FOREIGN PATENT DOCUMENTS 121889  7/1983  Japan ........................................ 358/31
129890  8/1983  Japan ........................................ 358/31
68792   4/1985  Japan ........................................ 358/31

Primary Examiner—John W. Shepperd
Attorney, Agent, or Firm—Francis I. Gray

[57] ABSTRACT

A diagonal correction method of a composite video decoder for reducing cross color errors detects the presence of diagonal luminance information in a luminance signal recovered from an encoded video signal. The recovered luminance signal is filtered to produce a diagonal correction value which is added to the recovered luminance signal as well as to a corresponding recovered chrominance signal when the diagonal luminance information is detected. The resulting luminance and chrominance signals have enhanced contrast and reduced chrominance error.

24 Claims, 4 Drawing Sheets

|   | A | C | E | G | I |
|---|---|---|---|---|---|
| 1 | Y+C | Y-C | Y+C | Y-C | Y+C |
| 2 | Y-C | Y+C | Y-C | Y+C | Y-C |
| 3 | Y+C | Y-C | Y+C | Y-C | Y+C |
| 4 | Y-C | Y+C | Y-C | Y+C | Y-C |
| 5 | Y+C | Y-C | Y+C | Y-C | Y+C |

FIG. 2a

|   | A | C | E | G | I |
|---|---|---|---|---|---|
| 1 | +1 | -2 | +2 | -2 | +1 |
| 2 | -4 | +8 | -8 | +8 | -4 |
| 3 | +8 | -12 | +12 | -12 | +8 |
| 4 | -4 | +8 | -8 | +8 | -4 |
| 5 | +1 | -2 | +2 | -2 | +1 |

FIG. 2b

|   | A | C | E | G | I |
|---|---|---|---|---|---|
| 1 |   |   |   |   |   |
| 2 |   | +1 | -2 | +1 |   |
| 3 |   | -2 | +4 | -2 |   |
| 4 |   | +1 | -2 | +1 |   |
| 5 |   |   |   |   |   |

DIAGONAL CORRECTION IN COMPOSITE VIDEO DECODER

BACKGROUND OF THE INVENTION

The present invention relates to composite video decoders, and more particularly to a diagonal correction method in composite video decoders for reducing errors in recovered luminance and chrominance signals due to diagonal high frequency luminance information being present in an encoded video signal.

In a displayed image where there is diagonal high frequency luminance information in an encoded video signal, errors occur in the decoding which appear as disturbing rainbow patters together with a loss of luminance contrast. This phenomenon commonly is known as "cross color." These cross color errors in decoding are caused by high frequency luminance information being misinterpreted as being partially chrominance. Due to the subcarrier phase reversal between lines and fields in the encoded video signal, the polarity of the chrominance errors reverses from frame to frame, or picture image to picture image. This makes the chrominance error quite visible to a viewer.

To better understand the problem of cross color it is helpful to look at an extreme case. Although the problem and the solution of the present invention are described herein in terms of NTSC encoded video, the discussion is equally applicable to PAL encoded video by accounting for the PAL differences from NTSC. In a video encoder red, green and blue video signals are combined to form a luminance signal and two color difference signals, the difference signals together describing the chrominance. The chrominance signals are low pass filtered to less than 1.5 MHz. The encoder produces two sine waves with a ninety degree phase difference at what is known as the subcarrier frequency, approximately 3.58 MHz for NTSC and 4.43 MHz for PAL. Each of the color difference signals amplitude modulates one of the sine waves, and the modulated sine waves are summed together to produce a single sine wave at the subcarrier frequency. This process is commonly referred to as quadrature amplitude modulation (QAM). The phase of the sine wave with reference to the subcarrier carries hue information, and the amplitude describes the saturation. The luminance information is added to the QAM chrominance signal to provide the brightness signal in the encoded signal.

Keeping the encoding process in mind the extreme case of the cross color problem is described. Given a video signal having alternating black and white lines at the subcarrier frequency and at an angle of forty-five degrees as shown in FIG. 1 with the black and white lines exchanging positions every frame, the encoder does not produce any chrominance information because none is present, i.e., the QAM chrominance signal has a zero amplitude. The encoder then adds in the luminance information to produce the encoded signal. When a decoder receives the signal energy at or near the subcarrier frequency, it interprets it as chrominance. In this extreme example all of the energy in the signal is at the subcarrier frequency and therefore is decoded as chrominance information. Also the decoder produces a luminance signal indicating a constant brightness rather than black and white lines. Thus the picture which is displayed, which should appear as black and white diagonal lines without color, appears as a constant color without lines. Even a comb filter decoder produces the same erroneous display due to the angle of the lines. A frame comb filter also produces the same display because the lines exchange position every frame. Therefore the encoded video signal having luminance information only is decoded as chrominance signal having no contrast in this extreme case.

It has been suggested that the best way to eliminate cross color in the decoded image is to pre-filter the luminance information in the video encoder before it is combined with the chrominance information. The filtering reduces or eliminates high frequency diagonal luminance information in the encoded signal, but at the expense of reducing or eliminating picture detail. Further this does not address the problem of all the video material already encoded by standard video encoders and recorded on videotape.

Another suggestion is the use of frame comb decoding, but such schemes do not work in the portions of the image depicting objects in motion.

In practice, however, cross color errors are not so overwhelming as in the extreme case described above, but it is annoying where and when it occurs. The magnitude of the error in any given situation increases as the frequency of the luminance information approaches the subcarrier frequency and as the angle approaches forty-five degrees from the horizontal, the angles being multiple and different in the PAL system. The error also increases with the contrast within the luminance information.

What is desired is a diagonal correction method in a composite decoder which effectively reduces the errors in the recovered luminance and chrominance signals caused by high frequency diagonal luminance information in an encoded video signal without the requirement of non-standard video encoders and regardless of the motion within a picture.

SUMMARY OF THE INVENTION

Accordingly the present invention provides a diagonal correction method in a composite video decoder which reduces errors in both the luminance and chrominance channels of the decoder causes by high frequency diagonal luminance information in an encoded video signal. Energy is detected in the recovered luminance signal that is both diagonal in orientation and near the subcarrier frequency. The detected energy signal is weighted and added back into the luminance signal to restore a significant amount of the lost luminance contrast, with the weighting factor chosen to prevent overcorrection. The same weighted correction signal is also applied to the chrominance channel.

The objects, advantages and other novel features of the present invention are apparent from the following detailed description when read in conjunction with the appended claims and attached drawing.

BRIEF DESCRIPTION OF THE DRAWING

FIG. 1 is a graphic illustration of a diagonal high frequency luminance encoded video signal which produces cross color errors in a composite video decoder.

FIGS. 2a and 2b are graphic illustrations of a preferred chrominance bandpass filter for the composite video decoder.

FIG. 3 is a graphic illustration of a diagonal correction filter according to the present invention.

FIGS. 4a—4e are graphic illustrations of diagonal signals processed by the diagonal correction method of the present invention.

DESCRIPTION OF THE PREFERRED EMBODIMENT

Figure 4C:
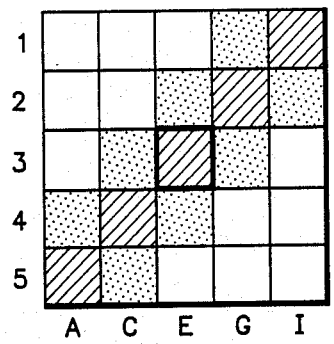

Referring now to FIGS. 2a and 2b, which correspond to FIGS. 2 and 4b of copending U.S. Pat. Application Ser. No. 60,271 filed June 10, 1987 by Stuart E. Lang entitled "Recovery of Luminance and Chrominance Information from an Encoded Color Television Signal", a chrominance bandpass filter for recovering luminance and chrominance signals from an encoded video signal is represented. FIG. 2a indicates that alternate pixels for each line of a video field which contain the same chrominance component are selected in the form of a matrix about a pixel, E3, being decoded. Lines 1-5 are consecutive lines within a television field and letters A, C, E, G, I are the columns of pixels containing the same chrominance component as the pixel E3. The remaining columns B, D, F, H, J (not shown) contain pixels with the other chrominance component. FIG. 2b illustrates the weighting factors applied to each pixel in order to derive a chrominance value for pixel E3. The weights are applied to each pixel, the results are summed, and the sum is divided by 128 to obtain the chrominance value for E3. The chrominance value is then subtracted from the total value for pixel E3 to obtain the luminance value. The same process is repeated for every pixel in the video image, creating the luminance and chrominance signals. This chrominance bandpass filter is two dimensional and well tuned which helps the cross color correction method of the present invention since errors are kept to a minimum in the first place. Further it is beneficial if the luminance channel is virtually free of errors introduced by chrominance transitions, generally referred to as "cross luminance" errors. The further processing of the chrominance and luminance signals to reduce the cross luminance errors is described in the aforementioned copending patent application where related errors also are removed from the chrominance channel at horizontal edges. Although the present cross color correction method is designed specifically to work with the resulting luminance and chrominance signals as produced by the copending patent application, this method works also to improve the luminance and chrominance signals obtained by other methods provided the two dimensional filtering and cross luminance reduction requirements are met.

With a good chrominance signal and a luminance signal free of cross luminance errors, the next step is the correction of cross color errors. The pixels that are applied to the weighting values depicted in FIG. 3 are decoded luminance values Yd. Once again the pixel E3 is the subject of the cross color correction. The weighting values are applied to each pixel's luminance value. The arrangement of the weighting factors is such that horizontal or vertical transitions produce zero correction values, i.e., the sum of the weighting factors in the horizontal and vertical directions is zero. Only diagonal luminance information is detected. The weighted results are summed, and the sum is divided by the sum of the absolute weight values according the following formula:

$$DCV = K[(4E3 - 2E2 - 2E4 - 2c3 - 2G3 - C2 - C4 - G2 - G4)/16]$$

where DCV is the diagonal correction value for pixel E3 and K is a constant. The value of K is arbitrary depending upon the composite video decoder which produced the decoded luminance signal, and has been set at 1.25 for the decoder described in the copending patent application. DCV is applied to both the luminance and chrominance values for pixel E3, reducing the errors in both channels. The value of K is adjusted for other luminance and chrominance separation methods and is chosen to avoid overcorrection.

A study of FIGS. 4a-4e shows how and why the present method works. Since the problem addressed is that of errors induced solely by luminance transitions, the discussion is simplified by limiting examples to signals representing images without color information. FIG. 1, as discussed previously, is an example of a luminance signal that after encoding is impossible to decode properly. The transitions are perfectly diagonal and at precisely the subcarrier frequency, i.e., it is effectively a QAM chrominance signal. The filter of FIG. 2b interprets it entirely as chrominance and the luminance signal no longer describes lines, resulting in a constant color field without any luminance detail. However the more likely luminance transition is that depicted in FIG. 4a. Again the filter of FIG. 2b produces a chrominance signal, but of lesser magnitude. A corresponding loss of contrast occurs in the luminance signal, but the line is not lost. Applying the filter of FIG. 3 to the luminance signal detects the diagonal information and produces a correction signal. The correction signal is then applied to both the chrominance and luminance channel to reduce the errors.

Returning to FIG. 1 the contrast of the decoded image is reduced to zero as the average value of the pixels E3 is the average value of the dark and light pixels. If the dark and light pixels originally have arbitrary values of 100 and 200 respectively, then the current values of the decoded luminance pixels is 150. Using the same dark and light values for pixel E3 of FIG. 4a the decoded luminance value is 123 rather than 100. For FIG. 4b the decoded luminance value for pixel E3 is 180 rather then 200. Pixels E2, E4, C3 and G3 in FIG. 4a receive the same value of 180 as pixel E3 of FIG. 4b. Pixels C2 and G4 of FIG. 4a have a derived value of 213 and pixels C4, E3, and G2 all have derived values of 123. By applying the filter of FIG. 3 the luminance value of pixel E3 of FIG. 4a is corrected from 123 to 102. Similarly for FIG. 4b pixel E3 is corrected from 180 to 188. In FIG. 4a pixels E2, E4, C3 and G3 also are corrected from 180 to 188. The contrast between luminance values for pixels E3 and G3 is increased from 57% to 86% of the original contrast by applying the correction. Errors in the chrominance values similarly are reduced by application of the same correction value.

Figure 4D:
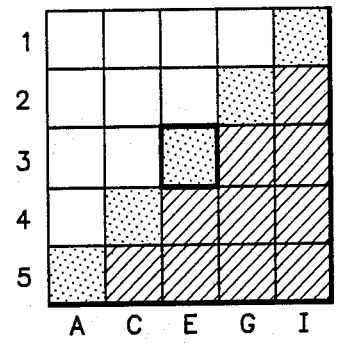
Figure 4E:
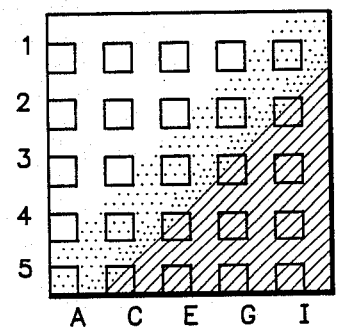

FIGS. 4c-4e are much closer to representing the worst of the transitions in luminance information which are likely to be contained in an actual encoded video signal. Video cameras filter images vertically and horizontally. The paths that the video signals travel before reaching the encoder provide additional horizontal filtering, both intended as well as unintended. The encoder itself provides additional horizontal filtering. The resulting horizontal luminance bandwidth is generally less than 6 MHz. Vertical bandwidth is usually less than that, although in the case of electronically generated images vertical bandwidth can be greater. In actual practice electronically generated images are filtered vertically and horizontally in order to prevent a jagged appearance on diagonal lines and edges. The filtering serves to lessen the ill effects of diagonal luminance information. The filtering also helps the current cross color correction method. FIGS. 4d and 4e depict a diagonal edge instead of a diagonal line. FIG. 4e shows the pixels in both fields of a video frame of both chrominance values. The boxes indicate the pixels shown in FIG. 4d. Diagonal edges produce smaller errors than diagonal lines when decoded since the luminance frequency is further from the subcarrier frequency.

Figure 5:
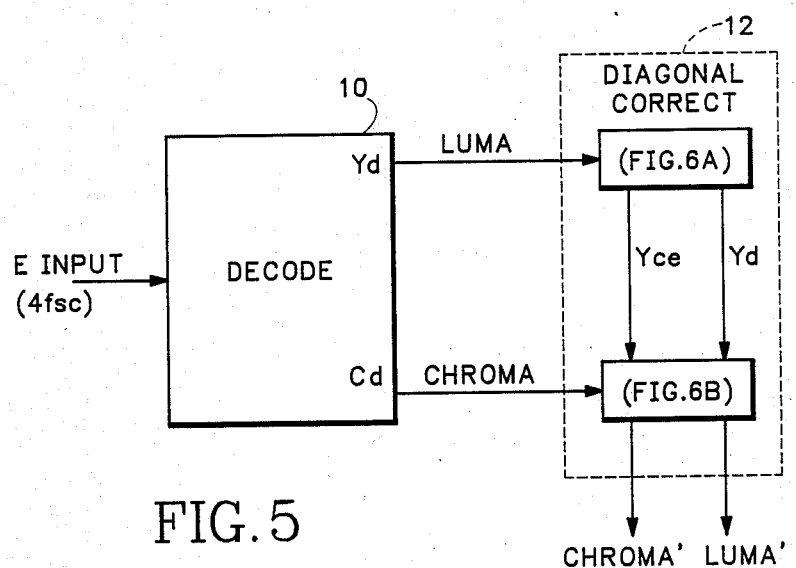
FIG. 5 is a block diagram of the composite video decoder having diagonal correction according to the present invention.

Referring now to FIG. 5 an encoded video signal EINPUT, shown as a signal sampled at four times subcarrier frequency, is input to a decode section 10 as described in the copending patent application. The removed luminance and chrominance signals, Yd (LUMA) and Cd (CHROMA), corrected for cross luminance, are input to a diagonal correction circuit 12 to produce the corrected chrominance and luminance signals CHROMA' and LUMA'.

Figure 6A:
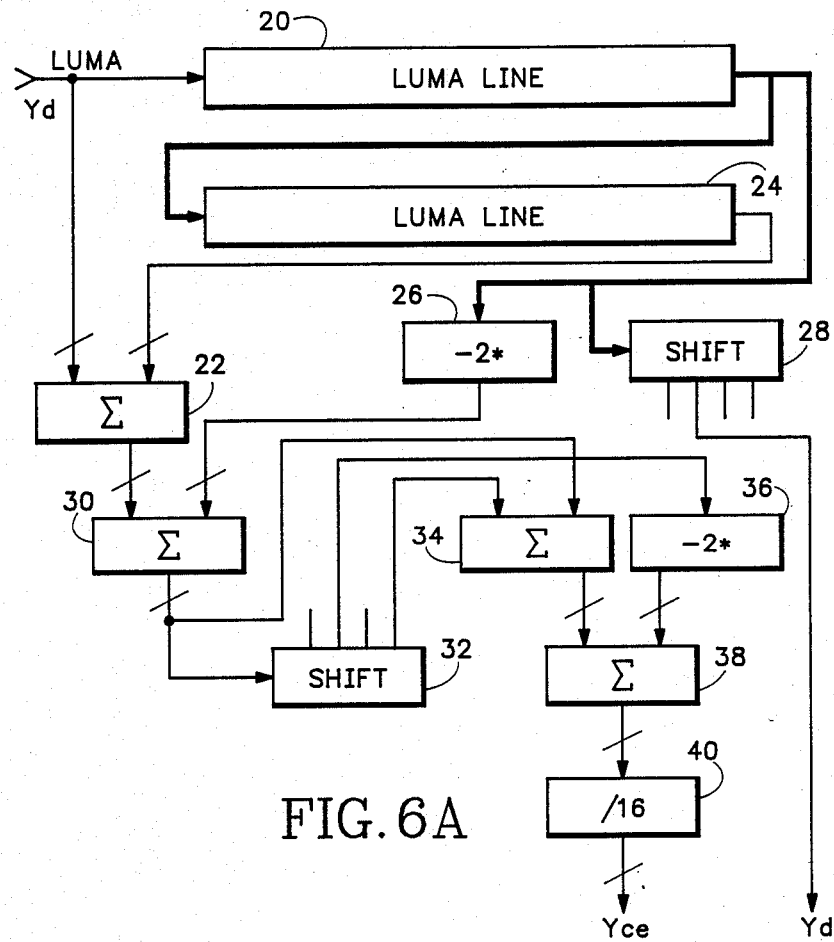
FIGS. 6a and 6b form a block diagram of a diagonal correction circuit according to the present invention.
Figure 6B:
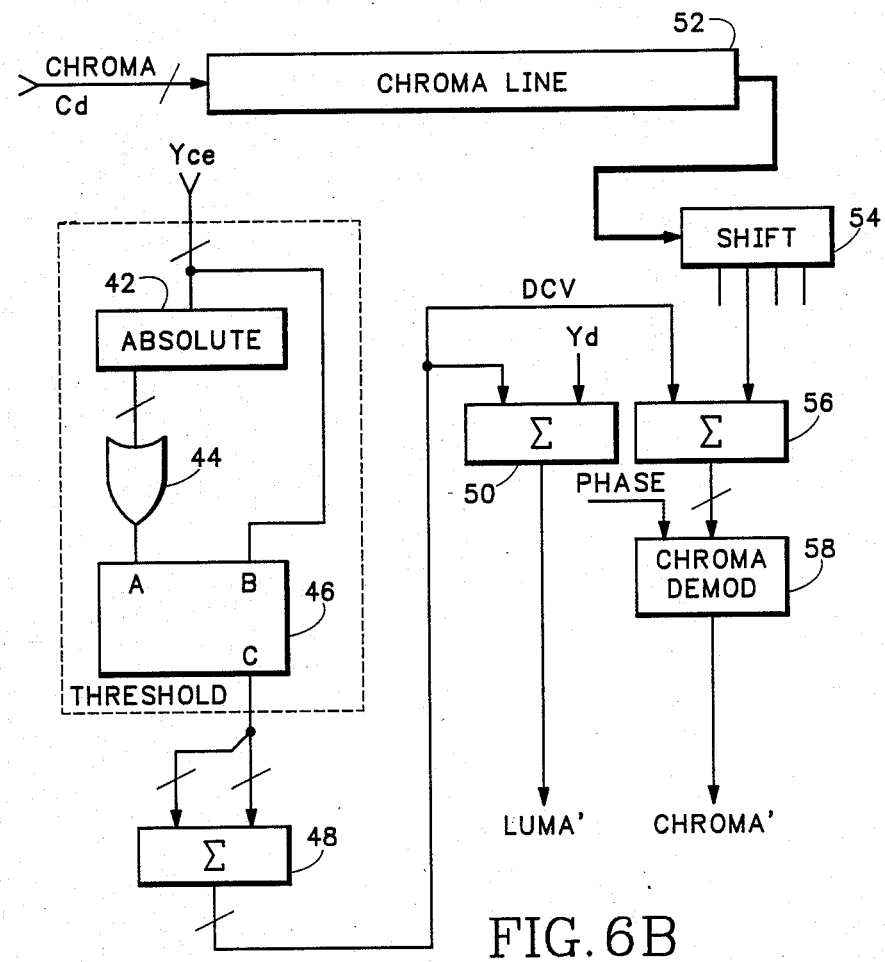

As shown in FIG. 6 the LUMA signal is input to a luminance delay line 20 and to a summer 22. The output of the luminance delay line 20 is input to another luminance delay line 24, a multiplier 26 and a shift register 28. The output of the second luminance delay line 24 is combined with the LUMA signal in the summer 22, the difference between the two inputs being equal to two horizontal lines. The intermediate horizontal line from the output of the first luminance delay line 20 after multiplication by a factor of minus two in multiplier 26 is combined with the output of summer 22 in another summer 30. The output of summer 30 is the vertical component of the filter depicted in FIG. 3 and feeds another shift register 32. The signal entering the shift register 32 and the signal exiting the last output of the shift register are both inputs to yet another summer 34. The signal from the second output of the shift register 32 is multiplied by a factor of minus two in another multiplier 36. The outputs of multiplier 36 and summer 34 are input to still another summer 38. The output of summer 38 is the sum of the products described above in the equation for DCV. The sum of the products from summer 38 is divided by sixteen in divider 40. The second output of the first shift register 28 provides the unchanged luminance pixel in proper time with the output of the divider 40.

The output of the divider 40 is input to an absolute value circuit 42. The most significant bit of the signal data entering the absolute value circuit 42 is a sign bit. If the sign bit is zero, then the number is positive and is not changed; but if the sign bit is one, then the number is two's complemented and the sign bit becomes a zero. The most significant bits of the absolute value from circuit 42 less the sign bit are input to an OR gate 44, the output of which controls a logic circuit 46. The combination of the absolute value circuit 42, the OR gate 44 and the logic circuit 46 forms a threshold circuit for the luminance error correction signal Yce. If the incoming signal Yce has a magnitude greater than a predetermined value, such as three parts in 256, then the logic circuit 46 is enabled by the output of the OR gate 44 to pass the incoming signal to the output of the logic circuit 46. Otherwise the output of the logic circuit 46 is forced to zero. This thresholding is done to prevent enhancement of low levels of residual chrominance that may remain in the luminance signal. The output of the logic circuit 46 is input as two inputs to a summer 48, one input being the most significant bits shifted to the right to produce the fractional portion of K, i.e., shifted two positions to the right to produce a value one quarter of the input value. The output of the summer 48 is the final luminance correction value DCV which is added to the decoded luminance Yd in summer 50 to produce the cross color corrected luminance LUMA'.

The decoded chrominance signal Cd is input to a chrominance delay line 52, the output of which is shifted two pixels by shift register 54, to produce the chrominance pixel in proper timing with the corresponding luminance pixel. The final luminance correction value is added to the output of the shift register 54 in summer 56 to provide a corrected chrominance signal. Since the chrominance signal has not yet been demodulated, the corrected chrominance signal is input to a demodulator 58 controlled by a PHASE signal. Each chrominance input value to the demodulator 58 is either passed to the output of the demodulator unchanged or is two's complemented. The output of the demodulator is the corrected and demodulated chrominance signal CHROMA' in time with the corrected luminance signal LUMA' from the summer 50.

Thus the present invention provides luminance and chrominance component decoded signals having cross color errors reduced through diagonal detecting and appropriate filtering to produce a diagonal correction value which is added to the respective decoded luminance and chrominance input signals.

What is claimed is:

1. An apparatus for reducing cross color errors in luminance and chrominance signals recovered from an encoded video signal comprising:
    means for detecting the presence of high frequency diagonal lines in the recovered luminance signal; and
    means for filtering the recovered luminance and chrominance signals so that cross color errors are reduced and contrast is enhanced when the high frequency diagonal lines are detected.

2. An apparatus as recited in claim 1 wherein the filtering means comprises:
    means for calculating a diagonal correction value from the recovered luminance signal having high frequency diagonal lines: and
    means for adding the diagonal correction value to the recovered luminance and chrominance signals so that cross color errors are reduced and contrast is enhanced.

3. An apparatus as recited in claim 2 wherein the detecting means comprises means for comparing the diagonal correction value with a threshold value such that when the diagonal correction value exceeds the threshold value high frequency diagonal lines are detected.

4. An apparatus as recited in claim 2 wherein the calculating means comprised means for obtaining a weighted average for each pixel of the recovered luminance signal having diagonal lines by combing vertically and horizontally over an array of pixels centered about a pixel of interest, the array of pixels being selected from a single field of the encoded video signal and being associated with the same chrominance component.

5. An apparatus as recited in claim 4 wherein the calculating means further comprises means for multiplying the pixel of interest by a constant to produce the diagonal correction value.

6. An apparatus as recited in claim 1 wherein the detecting means comprises a digital filter function having weighting factors for a pixel array around a pixel being corrected which add to a zero value in vertical and horizontal directions and to a non-zero value in diagonal directions.

7. An apparatus for reducing cross color errors in luminance and chrominance signals recovered from an encoded video signal comprising;
   means for vertically combining a plurality of horizontal lines of the recovered luminance signal according to predetermined weighting factors;
   means for horizontally combining a plurality of pixels having the same chrominance component from each horizontal line of the recovered luminance signal according to predetermined weighting factors;
   means for multiplying a sum of the outputs of the vertically and horizontally combining means by a constant to generate a diagonal correction value; and
   means for adding the diagonal correction value to the recovered luminance and chrominance signals to reduce chrominance errors and enhance contrast.

8. An apparatus as recited in claim 7 further comprising means for determining from the sum whether to generate the diagonal correction value, the diagonal correction value being generated when the sum exceeds a threshold value.

9. An apparatus as recited in claim 7 wherein the vertically combining means comprises:
   a first and a second luminance delay line connected in series having the recovered luminance signal as input to the first luminance delay line and having the output of the first luminance delay line as input to the second luminance delay line;
   means for summing the recovered luminance signal with the output of the second luminance delay line;
   means for multiplying the output of the first luminance delay line by a weight factor from the predetermined weighting factors to produce a vertical weighted output; and
   means for combining the vertical weighted output and the summing means output to produce a vertical output signal.

10. An apparatus as recited in claim 9 wherein the horizontally combining means comprises:
    means for shifting the vertical output signal;
    means for combining the vertical output signal with the shifted vertical output signal so that alternate pixels associated with the same chrominance component are combined;
    means for multiplying the shifted vertical output signal corresponding to an intermediate pixel associated with the same chrominance component as the alternate pixels by the weight factor to produce a horizontal weighted output; and
    means for summing the horizontal weighted output with the output of the alternate pixels combining means to produce the sum of the vertically and horizontally combining means.

11. An apparatus as recited in claim 7 wherein the multiplying means comprises:
    means for dividing the sum by a factor which is the sum of the absolute values of the predetermined weighting factors; and
    means for multiplying the output of the dividing means by a predetermined constant to produce the diagonal correction value.

12. An apparatus as recited in claim 7 wherein the adding means comprises:
    means for delaying the recovered luminance signal to be timed with the diagonal correction value;
    means for delaying the recovered chrominance signals to be timed with the diagonal correction values; and
    means for adding the diagonal correction value to the delayed luminance and chrominance signals to reduce chrominance errors and enhance contrast.

13. A method of reducing cross color errors in luminance and chrominance signals recovered from an encoded video signal comprising the steps of:
    detecting the presence of high frequency diagonal lines in the recovered luminance signal; and filtering the recovered luminance and chrominance signals so that cross color errors are reduced and contrast is enhanced when the high frequency diagonal lines are detected.

14. A method as recited in claim 13 wherein the filtering step comprises the steps of:
    calculating a diagonal correction value from the recovered luminance signal having high frequency diagonal lines; and
    adding the diagonal correction value to the recovered luminance and chrominance signals so that cross color errors are reduced and contrast is enhanced.

15. A method as recited in claim 14 wherein the detecting step comprises the step of comparing the diagonal correction value with a threshold value such that when the diagonal correction value exceeds the threshold value high frequency diagonal lines are detected.

16. A method as recited in claim 14 wherein the calculating step comprises the step of obtaining a weighted average for each pixel of the recovered luminance signal having diagonal lines by combing vertically and horizontally over an array of pixels centered about a pixel of interest, the array of pixels being selected from a signal field of the encoded video signal and being associated with the same chrominance component.

17. A method as recited in claim 16 wherein the calculating step further comprises the step of multiplying the pixel of interest by a constant to produce the diagonal correction value.

18. A method as recited in claim 13 wherein the detecting step comprises the step of weighting a pixel array with a digital filter function having weighting factors around a pixel being corrected which add to a zero value in vertical and horizontal directions and to a non-zero value in diagonal directions.

19. A method of reducing cross color errors in luminance and chrominance signals recovered from an encoded video signal comprising the steps of:
    vertically combining a plurality of horizontal lines of the recovered luminance signal according to predetermined weighting factors;
    horizontally combining a plurality of pixels associated with the same chrominance component from each horizontal line of the recovered luminance signal according to predetermined weighting factors;

multiplying a sum of the outputs of the vertically and horizontally combining steps by a constant to generate a diagonal correction value; and adding the diagonal correction value to the recovered luminance and chrominance signals to reduce chrominance errors and enhance contrast.

20. A method as recited in claim 19 further comprising the step of determining from the sum whether to generate the diagonal correction value, the diagonal correction value being generated when the sum exceeds a threshold value.

21. A method as recited in claim 19 wherein the vertically combining step comprises the steps of:

inputting the recovered luminance signal to a first luminance delay line, the output of the first luminance delay line delay line being connected to the input of a second luminance delay line;

summing the recovered luminance signal with the output of the second luminance delay line;

multiplying the output of the first luminance delay line by a weight factor from the predetermined weighting factors to produce a vertical weighted output; and combining the vertical weighted output and the output of the summing step to produce a vertical output signal.

22. A method as recited in claim 21 wherein the horizontally combining step comprises the steps of:

shifting the vertical output signal;

combining the vertical output signal with the shifted vertical output signal so that alternate pixels associated with the same chrominance component are combined;

multiplying the shifted vertical output signal corresponding to an intermediate pixel associated with the same chrominance component as the alternate pixels by the weight factor to produce a horizontal weighted output; and summing the horizontal weighted output with the output of the alternate pixels combining step to produce the sum of the vertically and horizontally combining steps.

23. A method as recited in claim 19 wherein the multiplying step comprises the steps of:

dividing the sum by a factor which is the sum of the absolute values of the predetermined weighting factors; and multiplying the output of the dividing step by a predetermined constant to produce the diagonal correction value.

24. A method as recited in claim 19 wherein the adding step comprises the steps of:

delaying the recovered luminance signal to be timed with the diagonal correction value;

delaying the recovered chrominance signals to be timed with the diagonal correction values; and adding the diagonal correction value to the delayed luminance and chrominance signals to reduce chrominance errors and enhance contrast.

* * * * *